(12) United States Patent
Strandell et al.

(10) Patent No.: US 6,505,109 B1
(45) Date of Patent: Jan. 7, 2003

(54) ARRANGEMENT AND METHOD FOR A DRIVING UNIT IN A VEHICLE

(75) Inventors: Gunnar Strandell, Södertälje (SE); Hans Wikström, Stockholm (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 09/720,948

(22) PCT Filed: Jun. 29, 1999

(86) PCT No.: PCT/SE99/01162

§ 371 (c)(1),
(2), (4) Date: Jan. 3, 2001

(87) PCT Pub. No.: WO00/03163

PCT Pub. Date: Jan. 20, 2000

(30) Foreign Application Priority Data

Jul. 6, 1998 (SE) ............................................. 9802411

(51) Int. Cl.[7] .................................................. G06F 7/00
(52) U.S. Cl. .......................... 701/51; 701/84; 701/87; 477/90; 477/91; 475/5
(58) Field of Search ................... 701/51, 54, 55, 701/62, 84, 87; 477/90, 91, 101, 107; 475/5

(56) References Cited

U.S. PATENT DOCUMENTS

| 5,038,901 A | * | 8/1991 | Parsons et al. | |
| 5,072,815 A | * | 12/1991 | Jarvis | |
| 5,148,899 A | * | 9/1992 | Berger | |
| 5,595,551 A | * | 1/1997 | Heldstrom et al. | 477/109 |
| 5,735,770 A | | 4/1998 | Omote et al. | |
| 5,993,355 A | * | 11/1999 | Nordgard | |
| 6,148,784 A | * | 11/2000 | Masberg et al. | 123/192.1 |
| 6,294,854 B1 | * | 9/2001 | Grosspietsch et al. | |

FOREIGN PATENT DOCUMENTS

| DE | 19615742 | 5/1997 |
| SE | 502807 | 1/1996 |
| SE | 504717 | 4/1997 |

* cited by examiner

*Primary Examiner*—Gertrude Arthur
(74) *Attorney, Agent, or Firm*—Ostrolenk, Faber, Gerb & Soffen, LLP

(57) ABSTRACT

An arrangement and a method for a drive unit of a vehicle. The drive unit incorporates an engine, a mechanical stepped gearbox and a connecting device which is designed to transmit rotary motion from the engine to the stepped gearbox. An electric rotor machine acts upon the connecting device such that substantially no torque is transmitted from the engine to the gearbox during gear changing. A control unit connected to the rotor machine may be responsive to the output shaft from the gearbox or to the speed of the engine.

20 Claims, 1 Drawing Sheet

ARRANGEMENT AND METHOD FOR A DRIVING UNIT IN A VEHICLE

BACKGROUND TO THE INVENTION, AND PREVIOUS TECHNOLOGY

The present invention relates to an arrangement and a method for a drive unit of a motor vehicle. Particularly, the invention relates to an apparatus and method for control of engine torque in mechanical stepped gearboxes, wherein there is a connection between the engine and a mechanical stepped gearbox to transmit rotary motion and there are means and a method of operation for acting on the connection, so that substantially no torque is transmitted from the engine to the gearbox.

In motor vehicles it is desirable to be able to change gear in a stepped gearbox without having to use the vehicle's clutch. This has been achieved, according to known technology, by the engine being controlled so that substantially no torque is transmitted from the engine to the gearbox during a gear change, i.e. while disengaging from one gear and engaging another.

Methods are known from SE 504 717 correspoding to U.S. Pat. 5,859,886 and 5,866,809 and SE 502 807 corresponding to U.S. Pat. No, 5,595,551 for controlling the torque delivered by an engine to a level such that substantially no torque is transmitted to the gearbox during gear disengagement. Such control of engine torque and speed can be achieved by adjusting the fuel supply to the engine.

A known practice from SE 502 154 is for gear engagement when changing up to be preceded by using an exhaust brake to reduce the engine speed to such a level that a synchronous speed is reached between the gearwheels which are intended to mesh with one another in the gearbox.

Controlling an engine by adjusting the amount of fuel supplied is complicated in that the fuel quantity injected is usually controlled by other conditions, some of which are intended to minimise fuel consumption. Nor is using an exhaust brake to reduce engine speed quickly an ideal practice, since it generates noise which may be disturbing.

Arranging an electric rotor machine on an output shaft of an engine is known in other contexts. These include the use of such a rotor machine as a starter motor for quickly getting the ordinary engine running. It may also be used for damping engine vibration particularly at low engine speeds, and for providing extra power during vehicle acceleration

SUMMARY OF THE INVENTION

The object of the present invention is to make gear changing in a mechanical stepped gearbox possible, without using the vehicle's clutch, by controlling torque and speed delivered to the gearbox during gear changing more quickly, more precisely and more quietly, than by using the known technology mentioned in the introduction.

This object is achieved by an arrangement which is characterised in that it incorporates an electric rotor machine connected to a connecting device. With such an electric rotor machine it is possible quickly, quietly and precisely to adjust torque delivered by the engine and its speed via the connecting device so that substantially no torque is transmitted to the gearbox during a gear change.

According to a preferred embodiment of the invention, said means incorporates a control unit designed to control the electric rotor machine. Such a control unit may be designed to use knowledge of necessary information concerning the state of the vehicle at the time to control a control device so that the rotor machine is loaded with a relevant electric voltage with a view to correcting the torque and speed of said connecting device to a desired level. This may entail the control unit being connected to a device designed to detect the engine speed. Such a device may for example be a sensor which detects the speed of a flywheel on the engine's output shaft.

The control unit may also be connected to a device designed to detect a parameter related to the seed of an output shaft of the gearbox. Such a device may be a sensor which detects for example, the speed of the output shaft of the gearbox, the speed of the vehicle's propeller shaft or the speed of the driving wheels.

According to a preferred embodiment of the invention, the control unit is designed so that, before the disengagement of a gear in the gearbox, the control unit controls the electric rotor machine so that the latter corrects the torque delivered by the engine to such a level that substantially no torque is transmitted to the gearbox. This means that when a positive driving torque is transmitted via the gearwheels enmeshed at the time the control unit will provide the electric rotor machine with a corresponding amount of negative retarding torque.

If instead a negative torque prevails in the gearwheels enmeshed at the time, which may occur when the vehicle is travelling downhill, the electric rotor machine will provide a corresponding positive driving torque. The gearwheels concerned will therefore not be subject to any torque when the gear concerned is disengaged.

According to another preferred embodiment of the invention, the control unit is designed so that, before the engagement of a gear in the gearbox, the control unit controls the electric rotor machine so that the connecting device is brought to a speed which is in proportion to the speed of an output shaft of the gearbox, this proportion being determined by the gear concerned. The control unit may in this case use knowledge of the speed of, for example, an output shaft of the gearbox and the gear concerned to calculate the speed at which the connecting device must be when the gear concerned is engaged. This will result, when changing up, in the electric rotor machine retarding the speed of the connecting device to the calculated level, and, when changing up, in its accelerating the connecting device to the calculated speed. This means that the relevant gearwheels in the gearbox which are intended to mesh will have a synchronous speed at which the gear concerned can be engaged.

According to another preferred embodiment, the electric rotor machine includes a stator and a rotor, and the rotor is arranged in the connecting device. This means that the electric rotor machine can directly transmit a torque or adjust the speed of the connecting device. By way of alternative, the rotor machine may be connected via a transmission element to the connecting device, thereby making it possible to achieve a gear change between them.

According to another preferred embodiment of the invention, the electric rotor machine is designed to function when necessary as a motor and provide torque to the connecting device and to function when necessary as a generator and retard the connecting device.

Such a rotor machine does not necessarily have only to act upon the connecting device during a gear change. A rotor machine which functions both as motor and generator may be connected to an electrical energy storage device which delivers electrical energy to the motor machine when it functions as a motor and receives electrical energy from the rotor machine when it functions as a generator. The energy extracted by reducing the speed of the connecting device may therefore be stored in the energy storage device. This energy may subsequently be used when the connecting device has to be provided with torque and speed. Said electrical energy storage device may include one or more electric batteries or, in the case of short-duration energy storage, take the form of one or more capacitors.

The present invention also includes a method of a drive unit according to the arrangement described above. On the basis of a known practice of arranging an electric rotor machine on an engine output shaft in a vehicle, the method is characterised in that the electric rotor machine is controlled so that substantially no torque is transmitted from the connecting device to the gearbox during gear changing. Very precise control of the torque and speed of the electric rotor machine is thus possible, unlike the situation according to the known technology whereby the electric rotor machine is substantially used for supplying energy to the ordinary engine and storing braking energy. The electric rotor machine is preferably controlled, before the disengagement of a gear in the gearbox, so as to correct the torque delivered from the engine to such a level that substantially no torque is transmitted to the gearbox. It is also advantageous if the electric rotor machine, before the engagement of a gear in the gearbox, is controlled so that the connecting device is brought to a speed which is in proportion to the speed of an output shaft of the gearbox, this proportion being determined by the gear concerned. Using the electric rotor machine in the foregoing manner makes it possible quickly and with great precision to adjust the torque and speed of the engine so that the disengagement and engagement of the relevant gears can take place without being affected by torque in the gearwheels enmeshed at the time in the gearbox.

BRIEF DESCRIPTION OF THE DRAWING

A preferred embodiment of the invention is described below by way of example with reference to the attached drawing, which is as follows.

DETAILED DESCRIPTION OF A PREFERRED EMBODIMENT OF THE INVENTION

Figure 1:
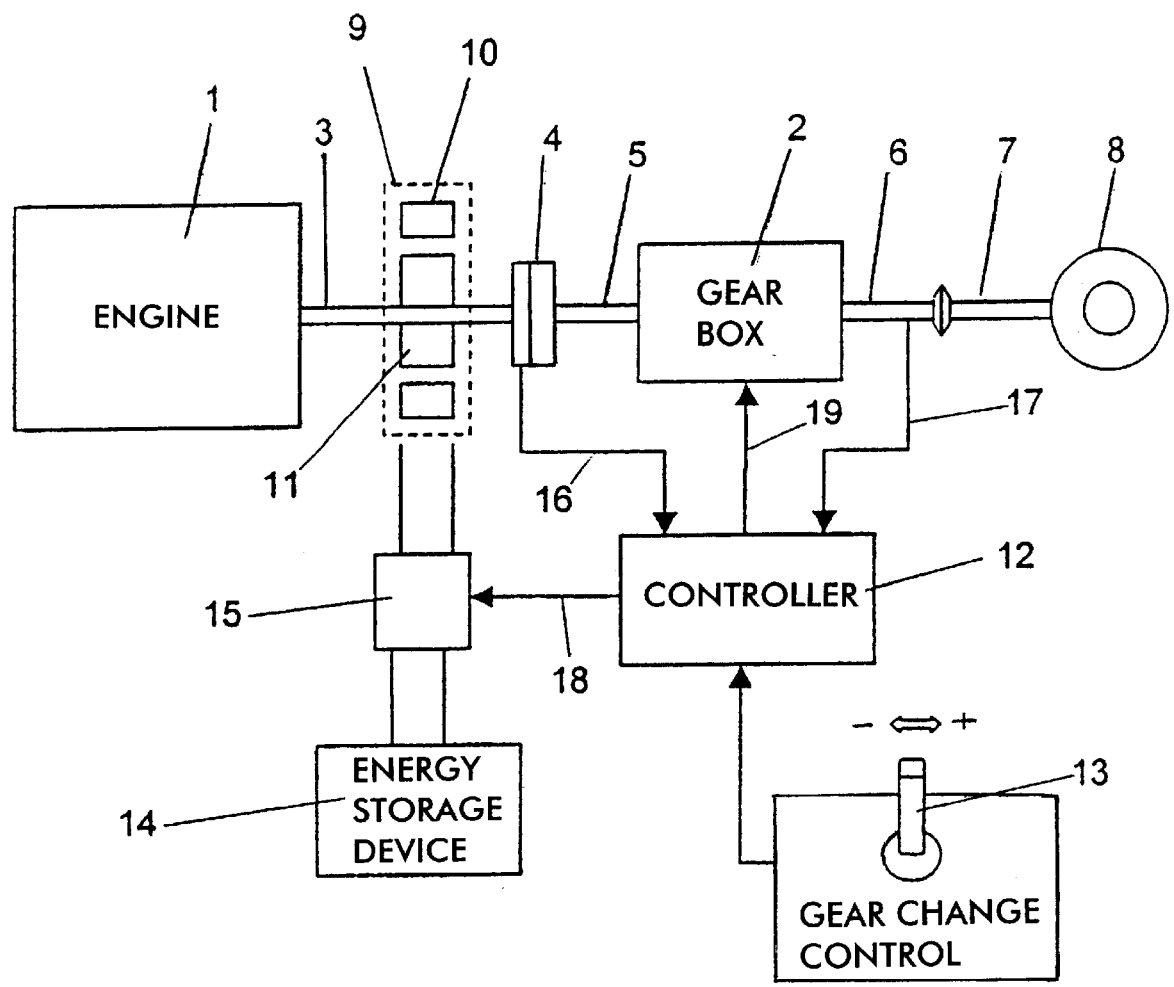
FIG. 1 depicts schematically an arrangement, according to the present invention, for a drive unit of a vehicle.

FIG. 1 depicts an arrangement, according to the present invention, for a drive unit of a vehicle. The drive unit incorporates an engine 1 and a mechanical stepped gearbox 2. A connecting device is designed to transmit rotary motion from the engine 1 to the stepped gearbox 2. The connecting device incorporates an output shaft 3 from the engine 1, a clutch 4 and an input shaft 5 to the gearbox 2. The connecting device is designed to constitute during gear changing a rigid rotating unit. After the gearbox 2, driving power supplied is led from the gearbox output shaft 6, e.g. via a propeller shaft 7, to the vehicle's driving wheels 8. The present invention makes it possible to execute gear changing in the gearbox 2 without using the clutch 4. The clutch 4 thus has no function in the present invention but is included in FIG. 1, since heavy-duty vehicles do in any case usually need a clutch function at the time of starting and stopping the vehicle. The clutch takes the form of a disc clutch of the kind which is conventional for vehicles and which is normally operated by the driver via a clutch pedal.

An electric rotor machine 9 is arranged on the output shaft 3 of the engine 1. The electric rotor machine 9 incorporates a stator 10 and a rotor 11 which is arranged firmly on the output shaft 3 of the engine 1. This rotor machine 9 is designed to act upon the output shaft 3 of the engine 1 so that substantially no torque is transmitted during the disengagement and engagement of gears in the gearbox 2. A control unit 12 is designed to control the electric rotor machine 9. The vehicle incorporates a gearchange control 13 designed to be easily movable sideways when in a position for manual gearchanging, whereby movement to the left causes changing down and movement to the right causes changing up The rotor machine 9 is connected to an electrical energy storage device 14 designed to deliver electrical energy to the rotor machine 9 when the latter functions as a motor and to receive electrical energy from the rotor machine 9 when the latter functions as a generator. A control device 15 is arranged to control said energy flow. The control unit 12 is designed to control the control device 15 in order to achieve control as desired of the rotor machine 9.

When a driver of the vehicle wishes to engage a higher or lower gear in the gearbox 2, the gearchange control 13 is moved in the desired direction, and a signal is sent to the control unit 12. The control unit 12, which may incorporate a microcomputer, is designed to receive a signal 16 concerning the speed of the engine 1. The control unit 12 is also designed to receive a signal 17 concerning the speed of the output shaft 6 of the gearbox 2. A possible alternative to this is detecting the speed of the vehicle's propeller shaft 7 or driving wheels 8. It is also possible for the vehicle's speed to be used in order to achieve an engine speed which is in proportion to the speed of the output shaft 6 of the gearbox 2. The control unit 12 is designed, before the disengagement of a gear in the gearbox 2, to calculate the torque which the electric rotor machine has to provide to the output shaft 3 of the engine 1 so that the gearwheels enmeshed in the gearbox 2 will not be subject to any torque. Knowledge of the characteristics of the engine 1 and the speed at the time of the engine 1 makes it possible to calculate this torque. The control unit 12 thus sends a signal 18 to the control device 15 which is designed to control the energy flow between the electric rotor machine 9 and the energy storage device 14. The control device 15 then controls the electric rotor machine 9 so that the latter delivers said calculated torque to the output shaft 3 of the engine 1. As this means that no torque is transmitted between the gearwheels enmeshed at the time in the gearbox 2, the gear concerned can be disengaged. The control unit 12 then sends a signal 19 to the gearbox 2, whereupon the gear concerned can be disengaged in the gearbox 2. Disengagement of gears in the gearbox can be brought about by suitable servo devices. If positive torque is transmitted to the gearbox before the disengagement of a gear in the gearbox, the electric rotor machine 9 functions as a generator and retards the shaft 3. This will result in electrical energy being supplied to the energy storage device 14. If on the contrary negative torque is transmitted to the gearbox 2 before the disengagement of a gear in the gearbox, the electric rotor machine 9 is designed to function as a motor and supply torque to the shaft 3. The energy supplied is drawn from the energy storage device 14.

After the disengagement described above of the gear concerned in the gearbox, the control unit 12 calculates the speed which the shaft 3 must have at the time of engagement of a gear in order to bring about a synchronous speed between the relevant gearwheels which are intended to mesh with one another in the gearbox 2. This speed is calculated by the control unit 12 on the basis of knowledge of the value of the signal 17 concerning the speed of the output shaft 6 of the gearbox 2 and which gear is intended to be engaged.

The control unit 12 then sends a signal 18 to the control device 15 which controls the energy supply to the electric rotor machine 9. During upward gear changing, the control device 15 controls the energy flow to the rotor machine so that the latter functions as a generator and retards the output shaft 3 of the engine 1 to the calculated speed. During downward gear changing, the control device 15 adjusts the energy flow to the rotor machine 9 so that the latter functions as a motor and accelerates the output shaft 3 of the engine 1 to the calculated speed. When the shaft 3 reaches said calculated speed, which may be indicated to the control unit 12 by the signal 16, the control unit 12 sends a signal 19 to the gearbox 2, whereupon the gear concerned is engaged.

Using an electric rotor machine 9 makes it possible for the aforesaid gearchange process to take place very quickly. It is also possible to control the electric rotor machine 9 very precisely in order to influence the torque and speed of the shaft 3. Moreover, the electric rotor machine 9 generates no noise which could be regarded as disturbing. Another advantage is that no problem arises when changing gear even at very low vehicle speeds, since the electric rotor machine 9 can provide extra torque at speeds below normal idling speed.

The invention is in no way limited to the embodiments described but may be varied freely within the scope of the patent claims. For example, it is possible for the present electric rotor machine to be combined with currently used methods for engine torque control during gear, changes, i.e. by controlling the amount of fuel injected or using an exhaust brake. The present electric rotor machine 9 may then be used for finely adjusting the torque and speed to the gearbox 2.

What is claimed is:

1. Apparatus for controlling the torque at a gearbox of a motor vehicle, wherein the motor vehicle includes an engine and a mechanical stepped gearbox;
    the apparatus including
        connecting device between the engine and the gearbox which transmits rotary motion from the engine to the gearbox;
        an electric rotor machine connected to the connecting device, the electric rotor machine being operable before disengagement of a gear in the gearbox for acting upon the connecting device so that substantially no torque is transmitted from the engine to the gearbox during a gear change.

2. The apparatus of claim 1, further comprising a control unit connected with the electric rotor machine for controlling the electric rotor machine for controlling the torque transmitted from the engine to the gearbox.

3. The apparatus of claim 2, wherein the control unit is operable to control the electric rotor machine for correcting the torque delivered from the engine to the gearbox to a level that substantially no torque is being transmitted to the gearbox.

4. The apparatus of claim 3, wherein the control unit controls the electric rotor machine to correct the torque delivered from the engine to a level that substantially no torque is transmitted to the gearbox before disengagement of a gear in the gearbox.

5. The apparatus of claim 3, further comprising a detecting device for detecting the speed of the engine, and the control unit being connected with the detecting device for controlling the electric rotor machine as a function of the speed of the engine.

6. The apparatus of claim 3, wherein the apparatus further comprises the gearbox including an output shaft; a detecting device for detecting a parameter related to the speed of the output shaft, and the control unit being connected to the detecting device so that operation of the control unit on the electric rotor machine is a function of the detected parameter related to the speed of the output shaft of the gearbox.

7. The arrangement of claim 3, wherein the electric rotor machine comprises a stator and further comprises a rotor positioned to cooperate with the stator, the rotor being arranged on the connecting device such that the rotor rotates with the connecting device.

8. The arrangement of claim 3, wherein the electric rotor machine connected with the connection device is operable to selectively function as a motor to supply torque to the connecting device.

9. The arrangement of claim 3, wherein the electric rotor machine is connected with the connection device to selectively function as a generator and reduce the rotation speed of the connecting device.

10. The arrangement of claim 9, wherein the electric rotor machine is also operable to selectively function as a motor to supply torque to the connecting device.

11. The apparatus of claim 10, further comprising an electric energy storage device connected to the electric rotor machine, the energy storage device is adapted to deliver electric energy to the electric rotor machine when the electric rotor machine is functioning as a motor and is adapted to receive electrical energy from the electric rotor machine when the electric rotor machine is functioning as a generator.

12. The apparatus of claim 3, wherein the connecting device of the apparatus comprises an engine output shaft from the engine, an input shaft to the gearbox and an operable clutch between the output shaft from the engine and the input shaft to the gearbox, the electric rotor machine being connected on and rotatable with the connecting device.

13. The apparatus of claim 12, wherein the electric rotor machine comprises a stator and further comprises a rotor positioned to cooperate with the stator, the rotor being arranged on the output shaft from the engine such that the rotor rotates with the connecting device.

14. The apparatus of claim 2, wherein the control unit is operable to cause the electric rotor machine to operate so that substantially no torque is transmitted from the engine to the gearbox during gear changing.

15. An apparatus for controlling the torque at a gearbox of a motor vehicle, wherein the motor vehicle includes an engine and a mechanical stepped gearbox, the apparatus comprising:
    a connecting device disposed between the engine and the gearbox, wherein the connecting device transmits a rotary motion from the engine to the gearbox;
    an electric rotor machine connected to the connecting device, wherein the electric rotor machine is operable before disengagement of a gear in the gearbox and acts upon the connecting device so that substantially no torque is transmitted from the engine to the gearbox during a gear change;
    an output shaft from the gearbox; and
    a control unit for controlling the electric rotor machine and for controlling the torque transmitted from the engine to the gearbox, wherein the control unit is connected to the electric rotor machine and the control unit controls the electric rotor machine so that the electric rotor machine brings the connecting device to a speed in proportion to a speed of the output shaft from the gearbox, wherein the proportional speed of the connecting device is determined by a gear into which the gearbox is to be shifted, at a time before engagement of the gear in the gearbox.

16. The apparatus of claim 15, wherein the control unit controls the electric rotor machine so that the electric rotor machine corrects the torque delivered from the engine to the gearbox to a level that substantially no torque is transmitted to the gearbox.

17. A method for controlling a drive unit of a vehicle, wherein the drive unit includes an engine, a mechanical stepped gearbox, a connecting device adapted for transmitting rotary motion from the engine to the gearbox and an electric rotor machine connected to the connecting device, the method comprising operating the electric rotor machine on the connecting device before disengagement of a gear so that substantially no torque is transmitted from the connecting device to the gearbox during gear changing.

18. The method of claim 17, further comprising controlling the electric rotor machine for correcting the torque delivered from the engine to a level so that substantially no torque is transmitted to the gearbox before disengagement of a gear in the gearbox and then disengaging a gear in the gearbox.

19. The method of claim 18, further comprising controlling the electric rotor machine so that the connecting device is brought to a speed which is in proportion to the speed of an output shaft from the gearbox, which proportion is determined by a selected gear setting, and so controlling before disengagement of a gear in the gearbox and then disengaging the gear in the gearbox.

20. The method of claim 17, further comprising controlling the electric rotor machine so that the connecting device is brought to a speed which is in proportion to the speed of an output shaft from the gearbox, which proportion is determined by a selected gear setting, and so controlling before disengagement of a gear in the gearbox and then disengaging the gear in the gearbox.

* * * * *